United States Patent
Duan et al.

(10) Patent No.: US 7,509,132 B2
(45) Date of Patent: Mar. 24, 2009

(54) METHOD OF SENDING A LOCATION REPORT FROM TARGET USER EQUIPMENT

(75) Inventors: Xiaoqin Duan, Shenzhen (CN); Wenlin Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 318 days.

(21) Appl. No.: 11/267,454

(22) Filed: Nov. 4, 2005

(65) Prior Publication Data

US 2006/0105788 A1    May 18, 2006

Related U.S. Application Data

(63) Continuation of application No. PCT/CN2004/001451, filed on Dec. 14, 2004.

(30) Foreign Application Priority Data

Dec. 22, 2003  (CN)  .................. 2003 1 0122446

(51) Int. Cl.
*H04W 24/00* (2006.01)
*H04W 4/00* (2006.01)
(52) U.S. Cl. .............. 455/456.1; 455/432.1; 455/414.1; 455/414.2; 455/456.2; 455/456.3; 455/456.5; 455/456.6
(58) Field of Classification Search .............. 455/414.1, 455/414.2, 432.1, 456.1, 456.2, 456.3, 456.5, 455/456.6
See application file for complete search history.

(56) References Cited

U.S. PATENT DOCUMENTS 7,054,620 B2 *  5/2006  Ewert et al. .............. 455/414.2

2004/0253964 A1 *  12/2004  Zhu ..................... 455/456.3
2006/0135174 A1 *  6/2006  Kraufvelin et al. ....... 455/456.1

FOREIGN PATENT DOCUMENTS

| CN | 1538773 | 10/2004 |
|---|---|---|
| EP | 1284580 | 2/2003 |
| KR | 20010109963 | 12/2001 |
| WO | WO 99/31917 | 6/1999 |

OTHER PUBLICATIONS

International Search Report for PCT/CN2004/001451, dated Mar. 31, 2005.

* cited by examiner

*Primary Examiner*—Barry W Taylor
(74) *Attorney, Agent, or Firm*—Marshall, Gerstein & Borun LLP

(57) ABSTRACT

Disclosed herein is a method useful for target user equipment (UE) sending a location report. When the target UE is located in a first central network (CN) of a location service (LCS) system, the target UE reports the location report to the LCS system. If the target UE does not receive a location report response from the LCS system, when being located in a second CN of LCS system, target UE will continue to report the location report to LCS system. In accordance with one aspect of the disclosed method, the waste of location service system resource is avoided as well as the execution efficiency of location service is increased. In addition, during procedure of change of area event location request, the consequent processing of request thereof is guaranteed to be normal, so that execution efficiency of location service is increased. Moreover, message interaction between the function entities is saved for the exception cases. Accordingly, the waste of public land mobile communication network resource caused by generation of excessive useless messages is avoided.

19 Claims, 3 Drawing Sheets

METHOD OF SENDING A LOCATION REPORT FROM TARGET USER EQUIPMENT

CROSS-REFERENCES TO RELATED APPLICATIONS

This is a continuation of International Application No. PCT/CN2004/001451, which was filed on Dec. 14, 2004, and which, in turn, claimed the benefit of Chinese Patent Application No. 200310122446.3, which was filed on Dec. 22, 2003, the entire disclosures of which are hereby incorporated herein by reference.

BACKGROUND OF THE DISCLOSURE

1. Field of the Technology

The present invention relates to network equipment location techniques and, more particularly, to a method of sending a location report from target user equipment.

2. Background of the Invention

For Location Service (LCS) of Public Land Mobile Network (PLMN), location estimates of target User Equipment (UE) are obtained through positioning techniques, where UE denotes a UE terminal to be positioned in a PLMN network, and location estimates can be either geographical latitude and longitude information or location of local streets. Location estimates of target UE obtained by PLMN network may be provided to target UE for self positioning, or provided for communication network itself, for zonal charging or operation maintenance, or provided to other client application ends requesting the location of the target UE, such as organizations and individuals, for supplemental service. Therefore, location service is of broad application in terms of emergency assistance, vehicle guidance, intelligence traffic system, work dispatching, team management, mobile yellow page inquiry and network performance enhancement, etc. LCS specifications as well as function mode, structure, state description and message flow of the whole LCS system are illustrated in The 3rd Generation Partnership Project (3GPP).

In PLMN network, function logic entities for implementing location service include Gateway Mobile Location Center (GMLC), user data storage server (HLR/HSS), Central Network (CN) and Radio Access Network (RAN). GMLC may further include Requesting GMLC (R-GMLC), Home GMLC (H-GMLC) and Visited GMLC (V-GMLC). R-GMLC is a GMLC for receiving the location request initiated by LCS client to target UE. H-GMLC is a GMLC which the target UC belongs to, V-GMLC is the current GMLC that is working for target UE, i.e., the GMLC in which the target UE is currently located. R-GMLC, H-GMLC and V-GMLC may be the same physical entity, or be different physical entities. CN may be either a Mobile Switching Center (MSC) or a Serving GPRS Support Node (SGSN).

At present, a change of area event location request is defined in 3GPP specification, and a procedure thereof is also defined. Change of area event location request means that LCS client pre-specifies target area coverage and change of area events, like target UE entering, leaving or sending LCS area event report to LCS client when located in specified area coverage. LCS system transmits information, like the specified target area coverage and change of area event, to target UE. Then target UE stores the information like the specified target area coverage and change of area event, to target UE, and meanwhile starts the corresponding application program. When the application program detects change of area event, like target UE entering, leaving or sending LCS area event report to LCS client when located in specified area coverage, LCS area event report is reported to LCS system, and LCS system will forward this LCS area event report to corresponding LCS client, so as to notify corresponding LCS client that specified change of area event is detected. In addition, LCS client can also appoint target UE to report number of times of LCS area event report, for example, only sending LCS area event report once, or periodically sending in a specified time range. To sum up, by utilizing change of area event location request, LCS client can conveniently define some tracking and monitoring location services, for instance, child tracking, pet tracking and so on, so that location service may be widely applied in the tracking and monitoring field.

FIG. 1 is a message interactive drawing illustrating change of area event location request procedure. As shown in FIG. 1, message interaction of change of area event location request procedure includes the following steps.

Step 101: LCS client sends LCS Service Request to R-GMLC, where the LCS Service Request carries target UE identity, the specified target area coverage and change of area event, and change of area event can be target UE entering, leaving or sending LCS area event report to LCS client when located in specified area coverage. This LCS Service Request can also carry effective time range of LCS Service Request, like start time or end time, as well as number of times that LCS Service Request demands LCS area event report to report. If it is required to send LCS area event report multiply and periodically, this LCS Service Request should further carry time interval for periodically sending LCS area event report. In addition, this LCS Service Request also carries country code of the country that the specified target area coverage belongs to. This LCS Service Request is the above-described change of area event location request.

Step 102: after receiving LCS Service Request, R-GMLC forwards this LCS Service Request to H-GMLC, then H-GMLC checks legality authentication of LCS client, so as to determine whether this LCS Service Request is allowed by target UE to provide location estimate of the target UE for this LCS client. If LCS client is legally authenticated, H-GMLC will send LCS Service Request to the V-GMLC that target UE is located. Otherwise, H-GMLC sends authentication failure acknowledgement to R-GMLC, so as to notify R-GMLC to reject the change of area event location request sent by LCS client in terms of target UE. R-GMLC notifies LCS client that the change of area event location request initiated by this LCS client is rejected, and change of area event location request procedure is ended.

Step 103: after receiving LCS Service Request, the V-GMLC in which target LE is currently located will conform the specified target area coverage carried in this LCS Service Request into terrain identity that can be identified by PLMN network, and send Provide Subscriber Location to the CN in which target LE is currently located, where this Provide Subscriber Location carries target UE identity, specified target area coverage which is transformed into PLMN network geological format as well as change of area event. Corresponding with information carried in LCS Service Request, this target UE request may carry number of times of send LCS area event report. If it is required to send LCS area event report multiply and periodically, this request should carry time interval for periodically sending LCS area event report.

Step 104: the CN in which target UE is currently located detects that target UE is in idle mode, so CN will start paging, authentication and encoding the target UE, so as to check if this target UE is a legal network subscriber. If the target UE is a legal network subscriber, step 105 may be directly executed. Further, the CN in which target UE is currently located sends private check notification, so as to notify target UE there is a LCS client requesting its location estimate. Then target UE personally checks whether to allow LCS system to provide location estimate of this target UE for the LCS client. If the LCS client is verified, target UE will notify CN in which target LE is located of this verification, and then step 105 is executed. If the LCS client is not verified, target UE will notify CN in which target LE is located of this non-verification. Then LCS system will reject the change of area event location request initiated by LCS client in terms of target UE, and end this change of area event location request procedure.

Step 105: the CN in which target LE is currently located sends Location Area Event Invoke request to target UE through RAN, where information carried by this Location Area Event Invoke request is corresponding with that carried by LCS service request. After receiving Location Area Event Invoke, target UE stores the specified target area coverage and change of area event. If this Location Area Event Invoke requires to multiply send LCS area event report, target UE needs to further store the time interval of periodical send LCS area event report. Then target UE starts relevant application program of its own, and monitors occurrence of send LCS area event report.

Step 106: target UE returns Location Area Event Invoke Acknowledgment (Ack) to the CN in which target LE is currently located, so as to notify CN that current change of area event location request has been accepted, and has been processed accordingly.

Steps 107-110: after receiving Location Area Event Invoke Ack, the CN in which. target UE is currently located sends Provide Subscriber Location Ack to the V-GMLC in which target UE is currently located, in order to notify V-GMLC that current change of area event location request has been accepted. After receiving Location Area Event Invoke Ack, the V-GMLC in which target UE is currently located sends LCS Service Response to H-GMLC, so as to notify H-GMLC that current change of area event location request has been accepted. After receiving LCS Service Response, H-GMLC sends LCS Service Response to R-GMLC, so as to notify R-GMLC that current change of area event location request has been accepted. After receiving LCS Service Response, R-GMLC sends LCS Service Response to LCS client; so as to notify request that current change of area event location request has been accepted.

Steps 111 and 112: change of area event of target UE occurs, namely target UE entering, leaving or being located in specified target area coverage, target UE sends LCS area event report to CN through RAN, where CN covers the specified target area coverage, so as to notify CN that change of area event has occurred, namely target UE entering, leaving or being located in specified target area coverage.

Step 113: after receiving LCS area event report, CN that covers the specified target area coverage sends Subscriber Location Report to V-GMLC of the specified target area coverage, so as to notify V-GMLC that the change of area event of target UE has occurred, i.e., that target UE has entered, left or been located in specified target area coverage.

Step 114: after receiving Subscriber Location Report, V-GMLC that covers specified target area coverage sends Subscriber Location Report Ack to CN that covers specified target area coverage, so as to notify CN that location report of target UE has been received, and CN generates a list record for current change of area event location request.

Step 115: after sending Subscriber Location Report Ack to CN that covers specified target area coverage, V-GMLC that covers specified target area coverage sends LCS Service Response to H-GMLC, so as to notify H-GMLC that the change of area event of target UE has occurred, i.e., that target UE has entered, left or been located in specified target area coverage.

Steps 116-118: after receiving LCS Service Response, H-GMLC authenticates LCS client over again, so as to guarantee that LCS client's providing location estimate of this target UE is in authorization scope of this target UE. If LCS client passes authentication of H-GMLC, H-GMLC will send LCS Service Response to R-GMLC, so as to notify R-GMLC that the change of area event of target UE has occurred. After receiving LCS Service Response, R-GMLC sends LCS Service Response to LCS client, so as to notify LCS client that the change of area event of target UE has occurred, i.e., that target UE has entered, left or been located in specified target area coverage.

If time interval of periodic send LCS area event report and number of times of send LCS area event report are carried in change of area event location request, the time interval of send LCS area event report, which is reported to CN that covers the specified target area coverage by target UE, should not be less than the time interval send LCS area event report, which is set in change of area event location request, and total times of send LCS area event report should not exceed the number of times set in change of area event location request, where each procedure of sending LCS area event report is the same as that of steps 111-118 by and large.

At present, in step 102 of change of area event location request procedure defined in 3GPP, after receiving LCS Service Request forwarded by R-GMLC, H-GMLC checks if LCS client is legally authenticated. If LCS client passes the legal authentication, according to country code of the country that specified target area coverage belongs to, where the country code is carried in LCS Service Request, H-GMLC determines whether PLMN network in which target UE is currently located can cover the country where the specified target area coverage is located. If yes, H-GMLC will send LCS Service Request to V-GMLC in which target UE is located according to step 102. Subsequent procedure of change of area event location request is the same as that of above-mentioned steps. If PLMN network in which target UE is currently located cannot cover the country where the specified target area coverage is located, H-GMLC will store the original LCS Service Request forwarded by R-GMLC, then generates a new LCS Service Request, which carries a PLMN network list covering the specified target area coverage, namely all PLMN network identities covering the specified target area coverage. When target UE enters a PLMN network included in this PLMN network list, which is the change of area event, LCS area event report will be reported. Through V-GMLC in which target UE is currently located and CN, H-GMLC downloads the change of area event in this new LCS Service Request as well as all PLMN network lists covering the specified target area coverage to the target UE, so that when target UE enters a PLMN network included in the PLMN network list, LCS area event report will be reported. When entering one or more than one PLMN network included in the PLMN network list, target UE will send LCS area event report to H-GMLC, so as to notify H-GMLC that target UE has entered the PLMN network included in this PLMN network list. After receiving LCS area event report of target UE, H-GMLC will learn that the PLMN network in which target LE is currently located can cover the specified target area coverage already, then through V-GMLC in which target LE is currently located and CN, the H-GMLC will download change of area event in the stored original LCS Service Request as well as the transformed target area coverage that can be recognized by network to target UE, it is requested to send LCS area event report when target UE enters, leaves or is located in specified area coverage.

Because change of area event location request procedure relates to GMLC and CN in which target LE is currently located, also relates GMLC and CN that covers specified target area coverage, GMLC and CN in which target LE is currently located as well as GMLC and CN that covers specified target area coverage must support change of area event location request procedure. However, because of deficiency in terms of implementing function and supporting location service capability, as well as differences among PLMN networks that function entities are located, GMLC that covers specified target area coverage and CN may not support change of area event location request procedure. In addition, according to practical program of service operation, service providers need to develop change of area event location request in a part of area, where function entities like GMLC and CN in certain areas will be updated and rebuilt, while change of area event location request will not be developed in other areas, and function entities like GMLC and CN in these areas will not be updated or rebuilt, so GMLC and CN located in the same PLMN network will have different capabilities for supporting location service. If GMLC and CN that cover specified target area coverage do not support change of area event location request procedure, when target UE enters a PLMN network included in the PLMN network list and the change of area event occurs, the LCS area event report reported by target UE will not be processed, which will lead to failure of processing change of area event location request, and LCS client cannot obtain LCS area event report of target UE, so that procedure exception of change of area event location request will occur. Meanwhile, under this condition, large amount of useless messages will be generated among function entities of PLMN network, so that there will be a waste of PLMN network resource.

From the above description it follows that, after LCS client sends change of area event location request in terms of target UE, if there is any function entity with insufficient supporting capability during procedure of processing the change of area event location request, this procedure thereof will be a failure, and interactive messages among function entities in PLMN network will be useless, consequently leading to waste of PLMN network resource. Especially when target UE requests periodic send LCS area event report, there will be large amount of useless messages in PLMN network, so waste of PLMN network resource will be more prominent. As far as LCS client is concerned, LCS client may have to wait a long time, and receive no corresponding processing result at all, so that execution efficiency of location service is quite low.

To the above-mentioned function entities, processing capability insufficiency toward location service will also lead to direct failure of location services other than change of area event location request.

SUMMARY OF THE INVENTION

In accordance with one aspect of the disclosure, a method is provided for target user equipment to send location report, which can avoid waste of LCS system resource, while increasing execution efficiency of location service. The method is useful for target user equipment to send the location report, where the method includes the steps of (A) target UE being located in the first CN of LCS system, sending location report to LCS system, and if the target UE does not receive the location report response from the LCS system, step B will be executed, and (B) target UE being located in the second CN of LCS system, continuing to report the location report to LCS system.

In some cases, the method further includes, after step (B), target UE determining whether location report response from the LCS system is received, and if not received, target UE being located in the third CN of LCS system, and continuing to report the location report to LCS system.

The method may further include, prior to step B, the step of (B0) target UE being located in the first CN of LCS system, re-sending location report to LCS system more times, and then determining whether location report response from the LCS system is received, and if not received, returning to execute step (B0).

In some cases, prior to step (B), the method further includes target UE recording a corresponding flag to indicate that a report has been sent unsuccessfully. Step (B) may include target UE being located in the second CN of LCS system, according to the stored failure flag, continuing to report the location report to LCS system.

The location report may be a LCS change of area event report carrying visited PLMN network identity of the target UE. LCS may predefine a PLMN network list, where the PLMN network identity belongs to this PLMN network list. Step (A) may be target UE being located in the first CN of LCS system, where the first CN being located in a PLMN network included in the PLMN network list, sending LCS area event report to LCS system, then determining whether area event report response from the LCS system is received, and if not received, executing step (B). Step (B) may be target UE being located in the second CN of LCS system, where the second CN being located in a PLMN network included in the PLMN network list, target UE continuing to send LCS area event report to LCS system.

In some cases, the method further includes the following steps prior to step A:

(A1) LCS system receiving the change of area event location request initiated by LCS client in terms of target UE, the change of area event location request carrying the specified target area coverage, determining whether PLMN network in which target LE is currently located can cover the specified target area coverage, and if yes, executing step (A2), and otherwise, executing step (A3);

(A2) LCS system sending change of area event location request that carries specified target area coverage to target UE, target UE and LCS system processing the change of area event location request, until the change of area event location request procedure is finished; and (A3) LCS system sending change of area event location request that carries PLMN network list to target UE, where the PLMN network can cover specified target area coverage, target UE receiving this change of area event location request and storing the PLMN network list.

The step of determining whether the PLMN network in which target LE is currently located can cover the specified target area coverage in step (A1) may include, according to country code of the specified target area coverage and PLMN network information in which target LE is currently located, determining whether the PLMN network in which target LE is currently located can cover the specified target area coverage.

In some cases, the method further includes, prior to step (A2), according to country code of the specified target area coverage, LCS system confirming the PLMN network list that covers the specified target area coverage.

The method may further include, after step B, the following steps:

(B1) LCS system receiving the LCS area event report reported by target UE; and (B2) LCS system sending change of area event location request to target UE, where the change of area event location request carrying the specified target area coverage and change of area event, target UE storing the specified target area coverage and change of area event. Prior to step (B2), the method may further include LCS system determining whether the CN that covers specified target area coverage supports procedure of change of area event location request, and if yes, executing step (B2), and otherwise, LCS ending procedure of change of area event location request. Prior to step (B2), the method may further include LCS system transforming the specified target area coverage into field information that can be recognized by PLMN network.

Where, when target UE moves into another PLMN network included in the PLMN network list, the method may further include target UE determining whether Area Definition of specified target area coverage provided by PLMN network has been received, and if not yet, target UE sending change of area event location request, which carries PLMN network identity, to LCS system, and otherwise, target UE taking no action.

In some cases, the method may further include, when location of target UE is being updated, determining whether update area information and the stored information of specified target area coverage are the same, and if yes, sending LCS area event report, and otherwise, waiting for change of area event report to occur. The update area information and information of specified target area coverage may be cell identities including PLMN network identities.

In some cases, step (B) may further include the following steps:

(B1) when location of target UE is being updated, determining whether the PLMN network identity in cell identity information of update area is uniform with that of the information of specified target area coverage, and if yes, executing step (B2), and otherwise, executing step (B3);

(B2) target UE determining whether information of update area is completely uniform with the stored information of specified target area coverage, and if yes, sending LCS area event report, and otherwise, waiting for change of area event report to occur; and (B3) when location of target UE is being updating due to roam into a new PLMN network, executing step (B1).

The CN may be an MSC or an SGSN.

In accordance with another aspect of the disclosure, when entering a CN of LCS system, target UE sends location report to LCS system, then determines whether the location report response from the LCS system is received. If not received, when entering another CN, target UE continues to send location report to LCS system, such that not only waste of location service system resource is avoided, but also execution efficiency of location service is increased. In addition, during the procedure of change of area event location request, consequent processing normality of change of area event location request can be guaranteed, so that execution efficiency of location service is increased. Moreover, message interaction in condition of exception among function entities is saved, and public land mobile communication network resource waste caused by large numbers of useless messages is avoided.

DETAILED DESCRIPTION OF PREFERRED EMBODIMENTS

In accordance with one aspect of the disclosure, when entering a CN of LCS system, target UE sends location report to LCS system, then determines whether the location report response from the LCS system is received. If not received, when entering another CN, target UE continues to send location report to LCS system.

Taking change of area event location request procedure as an example, the procedure of the present disclosure will be described in detail.

After receiving the change of area event location request initiated by LCS client in relation to target UE, if LCS system confirms that PLMN network in which target LE is currently located cannot cover the specified target area coverage, LCS system will send a new change of area event location request to target UE, where this request thereof carries a PLMN network list covering specified target area coverage. After receiving this change of area event location request, when entering a PLMN network included in the PLMN network list, target UE sends LCS area event report to LCS system, then determines whether the location report response from the CN of LCS system is received. If received (i.e., LCS system has successfully received the LCS area event report sent by target UE), LCS system will stop processing change of area event location request, and send the original change of area event location request that carries specified target area coverage to target UE. Target UE and LCS system process this change of area event location request. Otherwise, when entering another CN, target UE will continue to send LCS area event report to LCS system, where this CN is different from the one sending LCS area event report for the first time, and is located a PLMN network included in the PLMN network list.

Figure 1:
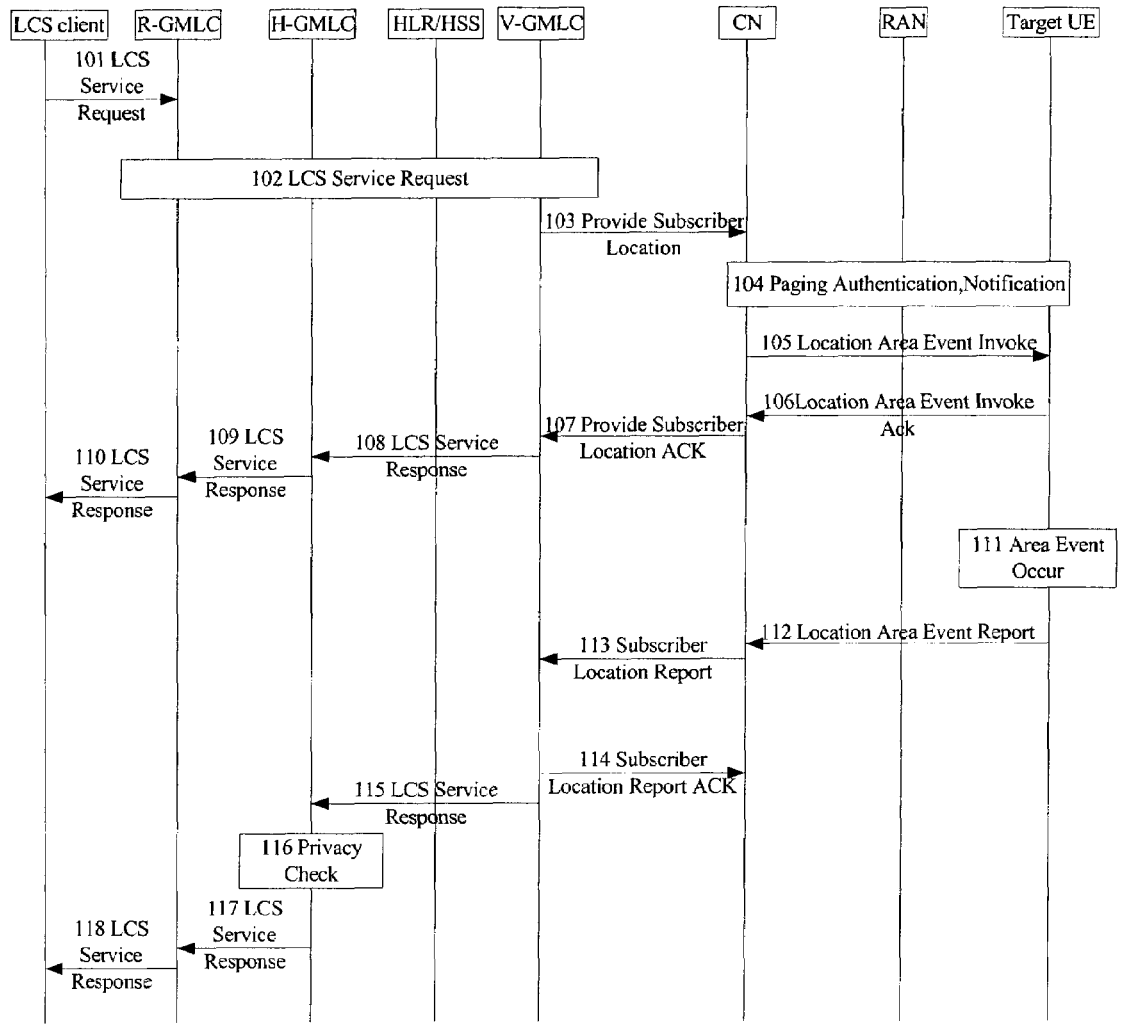
FIG. 1 is a message interactive drawing illustrating change of area event location request procedure in accordance with the prior art.
Figure 2:
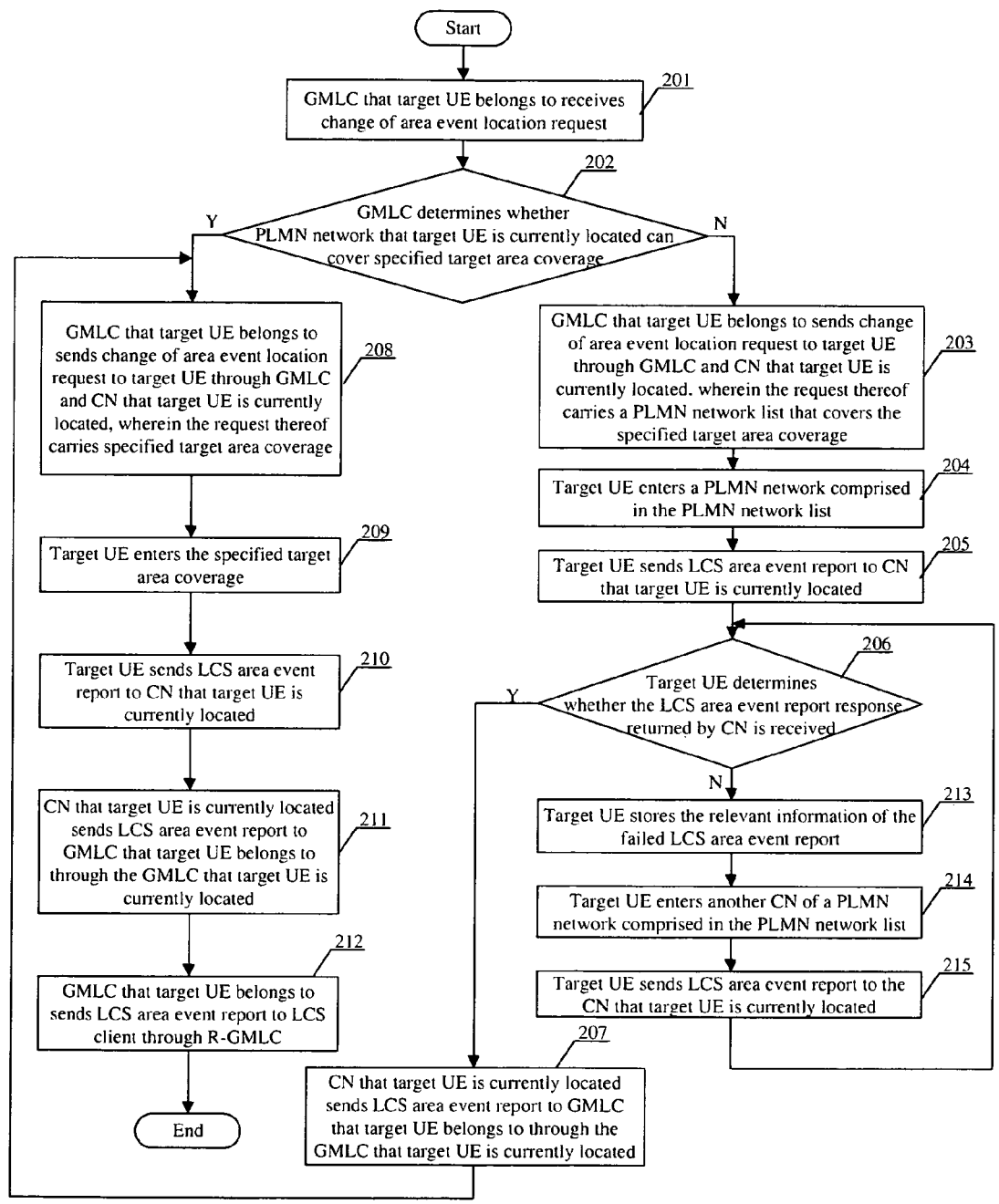
FIG. 2 is a flowchart illustrating procedure of processing change of area event location request in accordance with one embodiment.

FIG. 2 is a flowchart illustrating procedure of processing change of area event location request in accordance with one embodiment. As shown in FIG. 2, procedure of processing change of area event location request includes the following steps.

Steps 201 and 202: after receiving the change of area event location request initiated by LCS client in terms of target UE, according to country code of specified target area coverage and PLMN network information in which target LE is currently located, GMLC in which target LE is currently located determines whether PLMN network in which target LE is currently located can cover the specified target area coverage. If yes, step 208 is executed. Otherwise, step 203 is executed.

After receiving the change of area event location request, GMLC to which target UE belongs checks legal authentication of LCS client, so as to determine whether target UE allows LCS system to provide location estimate for LCS client. If LCS client passes the legal authentication, it is continued to determine whether PLMN network in which target LE is currently located can cover the specified target area coverage. Otherwise, the change of area event location request initiated by LCS client in terms of target UE is rejected, and procedure of change of area event location request is ended.

Step 203: according to country code of the specified target area coverage, GMLC to which target UE belongs confirms the PLMN network list that covers the specified target area coverage, then sends change of area event location request to target UE through GMLC and CN in which target LE is currently located, where this request thereof carries a PLMN network list covering the specified target area coverage. When entering one or more than one PLMN network included in PLMN network list, target UE is required to send LCS area event report. After receiving change of area event location request, target UE stores PLMN network list and change of area event.

Step 204: after a while, target UE enters a certain PLMN network of the stored PLMN network list, the change of area event to trigger target UE to send LCS area event report is detected.

Steps 205 and 206: target UE sends LCS area event report to CN in which target LE is currently located, so as to notify this CN that target UE has entered a certain PLMN network included in the PLMN network list, PLMN network identity that target UE enters is carried in the report, then target UE determines whether the LCS area event report response from the CN is received. If received, step 207 is executed. Otherwise, step 213 is executed.

After target UE sends LCS area event report to the CN in which target LE is located, if CN supports the procedure towards change of area event location request, CN will return a LCS area event report response to target UE. Otherwise, since CN cannot identify the LCS area event report sent by target UE, no response is to be returned to target UE.

If target UE receives no LCS area event report response from the CN in which target LE is currently located, i.e., target UE receives no response from CN at all, according to the predefined retransmission times, target UE will retransmit the LCS area event report to CN. If no LCS area event report response from the this CN is received all along, step 213 will be executed.

Step 207: CN in which target LE is currently located sends LCS. area event report to GMLC to which target UE belongs through the GMLC in which target LE is currently located, so as to notify GMLC to which target UE belongs that target UE has entered one or more than one PLMN network included in the PLMN network list. After GMLC to which target UE belongs receives the LCS area event report, step 208 will be executed.

Step 208: GMLC to which target UE belongs sends change of area event location request to target UE through GMLC and CN in which target LE is currently located, where the request thereof carries specified target area coverage, so that when target UE enters, leaves or is located in the specified target area coverage, LCS area event report can be reported. After receiving change of area event location request, target UE stores the specified target area coverage and change of area event.

In addition, after receiving change of area event location request that carries specified target area coverage, GMLC in which target LE is currently located determines whether CN covering specified target area coverage supports procedure of change of area event location request. If yes, the specified target area coverage will be transformed into a Area Definition that can be identified by the network, like cell ID, Location Area (LA) and so on, then the change of area event location request is sent to target UE through CN in which target LE is currently located, where the request thereof carries the specified target area coverage. Otherwise, location service error response will be returned to GMLC to which target UE belongs, so as to notify GMLC to which target UE belongs that, procedure of change of area event location request is not supported by CN covering the specified target area coverage. The GMLC to which target UE belongs sends this location service error response to LCS client, through the GMLC that first receives change of area event location request sent by LCS client.

GMLC can determine whether CN covering the specified target area coverage supports procedure of change of area event location request according to the stored location service processing capability information of CN, or determine whether CN covering the specified target area coverage supports procedure of change of area event location request according to information interaction of other GMLC, or determine whether CN covering the specified target area coverage supports procedure of change of area event location request by inquiring data base server in communication network, where the data base server stores location service processing capability information of all GMLC and CN in the whole communication network.

Steps 209 and 210: after a while, target UE enters, leaves or is located in the specified target area coverage, that is, the change of area event of target UE has occurred. Target UE sends LCS area event report to CN in which target LE is currently located, so as to notify this CN that change of area event of target UE has occurred, namely target UE has entered, left or been located in the specified target area coverage.

Steps 211 and 212: CN in which target LE is currently located sends LCS area event report to GMLC to which target UE belongs through the GMLC in which target LE is currently located, so as to notify GMLC to which target UE belongs that change of area event of target LE has occurred, i.e., target UE has entered, left or been located in the specified target area coverage. The GMLC to which target UE belongs sends LCS area event report to LCS client, through the GMLC that first receives change of area event location request sent by LCS client, so as to notify LCS client to which target UE belongs that change of area event of target UE has occurred, i.e., target UE has entered, left or been located in the specified target area coverage. Then procedure of change of area event location request is ended.

Steps 213-215: Target UE stores the relevant information of the failed LCS area event report, e.g. a failure flag for the failed LCS area event report set by target UE. Target UE enters another CN of a PLMN network included in the PLMN network list. Then target UE sends LCS area event report to the CN in which target LE is currently located according to relevant information of the stored failed LCS area event report, i.e. the failure flag, then step 206 is executed.

If after target UE sends LCS area event report, no LCS area event report response from the CN is received during effect time of change of area event location request, when effect time of change of area event location request is timeout, procedure of this change of area event location request will be ended.

If the specified target area coverage is covered by more than one PLMN network, when entering a PLMN network included in the PLMN network list, target UE will transmit the LCS area event report carrying PLMN network identity to LCS system, so as to notify LCS system that target UE has entered a PLMN network included in the PLMN network list. After receiving the LCS area event report, LCS system transforms the specified target area coverage into field identity that can be identified by PLMN network in which target LE is currently located, and sends the transformed field identity of specified target area coverage to target UE. When target UE moves into another PLMN network included in the PLMN network list, this target UE retransmits LCS area event report carrying PLMN network identity to LCS system, so as to notify LCS system that target UE has entered another PLMN network included in the PLMN network list. After receiving the LCS area event report, LCS system transforms the specified target area coverage into field identity that can be identified by PLMN network in which target LE is currently located, and sends the transformed field identity of specified target area coverage to target UE, and the PLMN network in which target LE is currently located is already different from the above-mentioned PLMN network.

According to the above procedure, field identity of the specified target area coverage that can be identified by the current PLMN is stored in target UE all along, so as to guarantee change of area event location request is normally processed.

Figure 3:
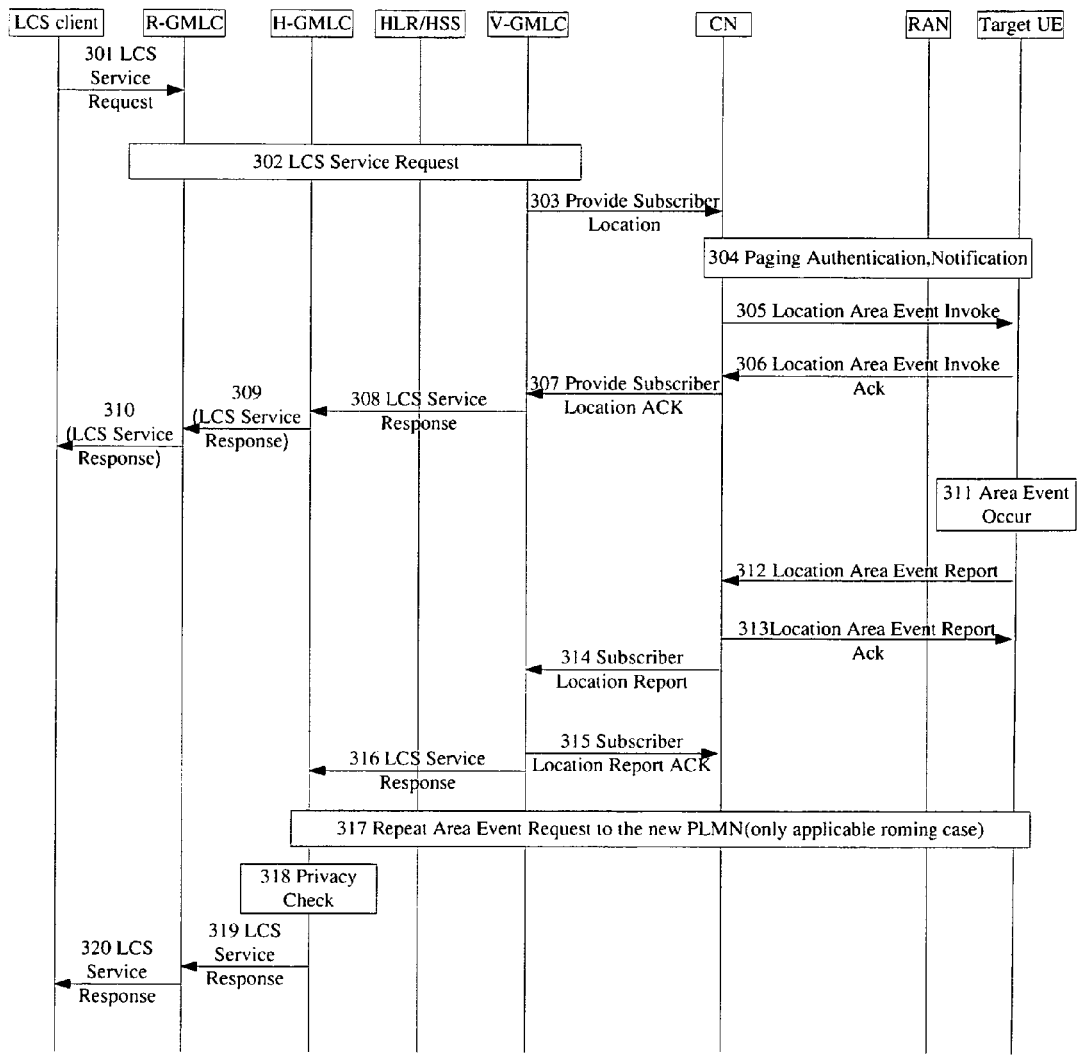
FIG. 3 is a message interactive drawing illustrating procedure of processing change of area event location request in accordance with one embodiment.

FIG. 3 is a message interactive drawing illustrating change of area event location request procedure. As shown in FIG. 3, message interaction of change of area event location request procedure includes the following steps.

Step 301 is the same as step 101.

Steps 302 and 303: after receiving LCS service request, R-GMLC forwards this LCS service request to H-GMLC, then H-GMLC checks legal authentication of LCS client, so as to determine whether target UE allows LCS system to provide location estimate of this target UE to this LCS client thereof. If LCS client passes the legal authentication, according to country code of the specified target area coverage and PLMN network information in which target LE is currently located, H-GMLC determines whether the PLMN network in which target LE is currently located can cover the specified target area coverage. If yes, change of area event location request will be processed according to existing technique. Otherwise, H-GMLC determines a PLMN network list covering the specified target area coverage according to country code of the specified target area coverage, then sends LCS service request to V-GMLC, where the LCS service request carries target UE identity and PLMN network list covering the specified target area coverage, it is required that when target UE enters one or more than one PLMN network included in the PLMN network list, target UE sends LCS area event report. After receiving LCS service request, V-GMLC sends Provide Subscriber Location request to the CN in which target LE is currently located, where this request carries target UE identity and PLMN network list.

Steps 304-310 are the same as steps 204-210.

Step 311: after a while, the change of area event of target UE occurs, namely target UE has entered a certain PLMN network included in PLMN network list.

Steps 312 and 313: target UE transmits LCS area event report to CN in which target LE is currently located through RAN, so as to notify CN that change of area event has occurred, i.e., target UE has entered a certain PLMN network included in PLMN network list. Target UE determines whether LCS area event report response from the CN in which target LE is currently located is received. If yes, target UE takes no action. Otherwise, target UE stores relevant information of the failed LCS area event report, such as failure flag of this failed LCS area event report set by target UE, when target UE enters another CN of a PLMN network included in the PLMN network list, target UE sends LCS area event report to this CN. Another CN and the CN can be located in the same PLMN network, or in different PLMN networks.

Steps 314-316 are the same as steps 113-115.

After receiving the LCS service request carrying LCS area event report, H-GMLC sends LCS service request to V-GMLC, where this LCS service request carries target UE identity and the specified target area coverage. After receiving this LCS service request, V-GMLC determines whether the CN that covers specified target area coverage supports procedure of change of area event location request. If yes, subsequent procedure is the same as that of the steps 103-118 in existing technology. Otherwise, V-GMLC returns location service error response to H-GMLC, so as to notify H-GMLC that CN that covers specified target area coverage does not support procedure of change of area event location request, and H-GMLC returns this location service error response to LCS client through R-GMLC.

Step 317: when target UE moves into another PLMN network included in the PLMN network list, target UE first determines whether Area Definition of specified target area coverage network in this PLMN network has been received. If yes, target UE takes no action. Otherwise, target UE sends the LCS area event report to CN in which target LE is currently located through RAN, so as to notify the CN that change of area event has occurred, i.e., the target UE has entered another PLMN network included in the PLMN network list. Target UE determines whether LCS area event report response from the CN in which target LE is currently located is received. If yes, target UE takes no action. Otherwise, target UE stores relevant information of the failed LCS area event report, such as failure flag of this failed LCS area event report set by target UE, when target UE enters another CN of a PLMN network included in the PLMN network list, target UE sends LCS area event report to this CN.

Steps 318-320 are the same as steps 117-119.

In addition, when location of target UE is being updated, target UE will determine whether change of area event has occurred, namely determining whether the updated area information matches the self stored specified target area coverage information. When the updated area information and the self stored specified target area coverage information completely match each other, target UE can determine that change of area event has occurred. Then this LCS area event report is transmitted to LCS system. The present embodiment will be described taking for example that specified target area coverage information stored in target UE is Cell ID.

Cell ID information generally includes: Mobile Country Code (MCC), Mobile Network Code (MNC), Location Area Code (LAC) and Cell Identity (CI), where MCC and MNC constitute PLMN identity.

When location of target is UE is being updated, it is determined whether Cell ID of the updated area completely matches one ID of the self stored specified target area coverage Cell ID list. If yes, it is determined that change of area event has occurred, and LCS area event report is reported to LCS system. Otherwise, target UE continues to wait for occurrence of change of area event.

If target UE moves frequently, that is, location update times of target UE is excessive, when target UE is not located in a PLMN network covering the specified target area coverage, in order to avoid useless matching determine of Cell ID information at each location update, which may lead to heavy consumption of calculation resource of target UE, match judgment logic of Cell ID concerning target UE can be classified. For instance, target UE first determines whether the PLMN network identity in which target LE is currently located matches one PLMN network identity in the self stored Cell ID information list. If yes, target UE continues to determine complete match of Cell ID. Otherwise, target UE determines that PLMN network in which target LE is currently located cannot cover the specified target area, and will not determine match of Cell ID during subsequent location update procedure of non-PLMN network shift. Cell ID match judgment is only performed during location update procedure of PLMN network shift.

The above description sets forth one or more preferred embodiments with the understanding that it is not used to confine the protective scope of the following claims to the described embodiments.

The invention claimed is:

1. A method of sending a location report, the method comprising:
  (A) sending a first location report to a first central network (CN) of a location service (LCS) system when a target user equipment (UE) is located in the first CN of the LCS system, and if the target UE does not receive a first location report response from the first CN of the LCS system, executing (B); and
  (B) the target UE recording a failure flag to indicate that the first location report has been sent unsuccessfully, and sending a second location report to a second CN of the LCS system in accordance with the recorded failure flag when the target UE is located in the second CN of the LCS system.

2. The method according to claim 1, further comprising, after (B), the target UE determining whether a second location report response from the second CN of the LCS system is received, and if not received, sending a third location report to a third CN of the LCS system when the target UE is located in the third CN of the LCS system.

3. The method according to claim 1, further comprising, if the target UE does not receive the first location report response from the first CN of the LCS system:
  (B0) re-sending the first location report to the first CN of the LCS system more times when the target UE is located in the first CN of the LCS system; and
  (B1) determining whether the first location report response from the first CN of the LCS system is received, and if not received, returning to execute (B0).

4. The method according to claim 1, wherein the first and second CNs are a Mobile Switching Center (MSC) or a Serving GPRS Support Node (SGSN).

5. A method of sending a location report, the method comprising:
  if a location service (LCS) client sends a first change of area event location request to a LCS system against a target user equipment (UE), and a currently visited Public Land Mobile Network (PLMN) network of the target UE does not cover a specific target area coverage identified in the first change of area event location request, and the LCS system sending a third change of area event location request that carries a PLMN network list to the target UE;
  (A) sending a first location report carrying a visited PLMN network identity of the target UE to a first central network (CN) of the (LCS) LCS system when the target UE is located in the first CN of the LCS system, wherein the visited PLMN network identity belongs to the PLMN network list predefined by the LCS system, the first CN is located in the PLMN network included in the PLMN network list, and the PLMN network list is a list of PLMN networks covering the specified target area coverage, and then determining whether a first location report response from the first CN of the LCS system is received, and if not received, executing (B); and
  (B) sending a second location report to a second CN of the LCS system when the target UE is located in the second CN of the LCS system and the second CN is located in the PLMN network included in the PLMN network list.

6. The method according to claim 5, the currently visited PLMN network of the target UE can cover the specified target area coverage if, the LCS system sending a second change of area event location request that carries the specified target area coverage to the target UE, and the target UE and the LCS system processing the second change of area event location request until a change of area event location request procedure is finished.

7. The method according to claim 6, wherein determining whether the currently visited PLMN network of the target UE can cover the specified target area coverage comprises determining whether the currently visited PLMN network can cover the specified target area coverage according to a country code of the specified target area coverage and the PLMN network information for where the target UE is currently located.

8. The method according to claim 6, further comprising, prior to the LCS system sending a second change of area event location request that carries the specified target area coverage to the target UE, and the target UE and the LCS system processing the second change of area event location request until a change of area event location request procedure is finished, the LCS system confirming the PLMN network list that covers the specified target area coverage according to a country code of the specified target area coverage.

9. The method according to claim 6, further comprising:
  (B1) the LCS system receiving the location report sent by the target UE; and
  (B2) the LCS system sending the change of area event location request to the target UE, wherein the change of area event location request carrying the specified target area coverage and the change of area event, and the target UE storing the specified target area coverage and the change of area event.

10. The method according to claim 9, further comprising, prior to (B2) the LCS system determining whether a CN that covers the specified target area coverage supports a procedure of the change of area event location request, and if yes, executing (B2), and otherwise, the LCS system initializing an ending procedure of the change of area event location request.

11. The method according to claim 10, further comprising, prior to (B2), the LCS system transforming the specified target area coverage into field information that can be recognized by the PLMN network.

12. The method according to claim 6, wherein, when the target UE moves into another PLMN network included in the PLMN network list, the method further comprising the target UE determining whether an Area Definition of the specified target area coverage provided by the PLMN network has been received, and if not yet, the target UE sending the change of area event location request, which carries the PLMN network identity, to the LCS system, and otherwise, the target UE taking no action.

13. The method according to claim 6, further comprising, when a location of the target UE is being updated, determining whether the update area information and the stored information of the specified target area coverage are identical, and if yes, sending the LCS area event report, and otherwise, waiting for the change of area event report to occur.

14. The method according to claim 13, wherein the update area information and the stored information of the specified target area coverage are cell identities comprising PLMN network identities.

15. The method according to claim 14, further comprising:
(B1) when location of the target UE is being updated, determining whether the PLMN network identity in cell identity information of the update area information is uniform with that of the stored information of the specified target area coverage, and if yes, executing (B2), and otherwise, executing (B3);
(B2) the target UE determining whether the information of the update area is completely uniform with the stored information of specified target area coverage, and if yes, sending the location report, and otherwise, waiting for the change of area event report to occur; and
(B3) when the location of the target UE is being updated due to roaming into a new PLMN network, executing (B1).

16. A method of sending a location report, the method comprising:
(A) sending a first location report carrying a visited Public Land Mobile Network (PLMN) network identity of a target user equipment (UE) to a first central network (CN) of a location service (LCS) system when the target UE is located in the first CN of the LCS system, wherein the visited PLMN network identity belongs to a PLMN network list predefined by the LCS system, the first CN is located in a PLMN network included in the PLMN network list, and then determining whether a first location report response from the first CN of the LCS system is received, and if not received, executing (B); and
(B) the target UE recording a failure flag to indicate that the first location report has been sent unsuccessfully, and the target UE sending a second location report to the LCS system when the target UE is located in a second CN of the LCS system, wherein the second CN is located in the PLMN network included in the PLMN network list.

17. The method according to claim 16, further comprising:
(A1) the LCS system receiving a first change of area event location request initiated by a LCS client against the target UE, the first change of area event location request carrying a specified target area coverage, and determining whether the currently visited PLMN network of the target UB can cover the specified target area coverage, and if yes, executing (A2), otherwise, executing (A3);
(A2) the LCS system sending a second change of area event location request that carries the specified target area coverage to the target UE, and the target UE and the LCS system processing the second change of area event location request until a change of area event location request procedure is finished;
(A3) the LCS system sending a third change of area event location request that carries the PLMN network list to the target UE, wherein the PLMN network can cover the specified target area coverage, and the target UE receiving the third change of area event location request and storing the PLMN network list.

18. The method according to claim 17, wherein determining whether the PLMN network of the target UE can cover the specified target area coverage in (A1) comprises determining whether the PLMN network can cover the specified target area coverage according to a country code of the specified target area coverage and the PLMN network information for where the target UE is currently located.

19. The method according to claim 17, further comprising:
(B1) the LCS system receiving the location report sent by the target UE; and
(B2) the LCS system sending the change of area event location request to the target UE, wherein the change of area event location request carrying the specified target area coverage and the change of area event, and the target UE storing the specified target area coverage and the change of area event.

* * * * *